United States Patent [19]

Oskam

[11] 4,116,538

[45] Sep. 26, 1978

[54] MOTOR-CAR MIRROR ADJUSTABLE ABOUT TWO PERPENDICULAR AXES

[75] Inventor: Aane Adriaan Oskam, De Meern, Netherlands

[73] Assignee: Industrie Koot B.V., Montfoort, Netherlands

[21] Appl. No.: 793,354

[22] Filed: May 3, 1977

[30] Foreign Application Priority Data

Jan. 10, 1977 [NL] Netherlands ............... 7700178

[51] Int. Cl.² ........................................... G02B 7/18
[52] U.S. Cl. ............................. 350/289; 74/471 XY
[58] Field of Search ................... 350/289, 61, 67; 74/501 M, 471 XY

[56] References Cited

U.S. PATENT DOCUMENTS

| Re. 27,653 | 5/1973 | Oskam | 350/289 |
|---|---|---|---|
| 2,855,825 | 10/1968 | Feder | 74/501 M |
| 3,064,536 | 11/1962 | Weingartner | 350/289 |
| 3,283,654 | 11/1966 | Talbot | 350/67 |
| 3,575,496 | 4/1971 | Pollock et al. | 350/289 |
| 3,592,074 | 7/1971 | Petersen et al. | 74/501 M |
| 3,711,179 | 1/1973 | Takeda | 350/289 |

Primary Examiner—Jon W. Henry

[57] ABSTRACT

Apparatus for adjusting a motor-car mirror about two mutually perpendicular axes. The apparatus has a housing having therein a reversible motor, an electromagnetically operable clutch, and two planetary transmission assemblies each having an output shaft connected to a mirror adjusting unit. The units act upon a tilting adjusting ring which in any position is in sealing contact with a raised edge of the bottom member of the housing.

A safety housing for mounting the apparatus has a protective cap having two substantially parallel partitions spaced apart so as to be capable of receiving the top part of a mounting column between them. A clamping device forces the partitions against the surface of the column. The cap will thus withstand light impact forces, but turn relative to the column when struck by a bicycle or other vehicle in traffic.

5 Claims, 10 Drawing Figures

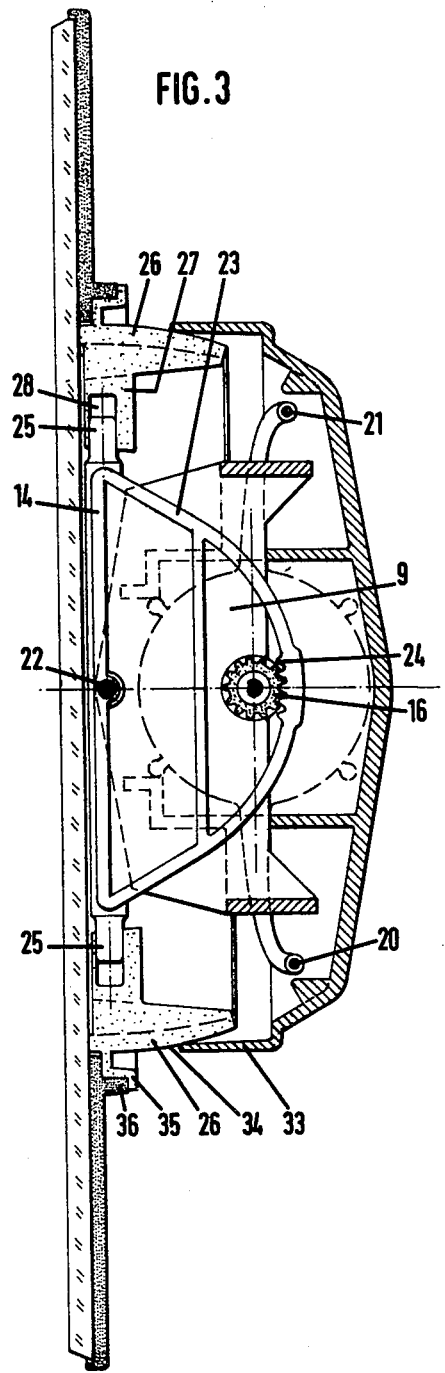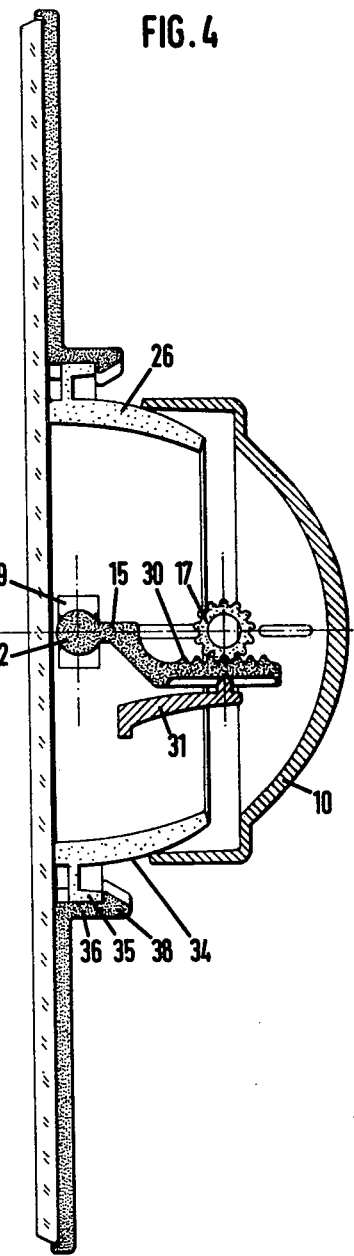

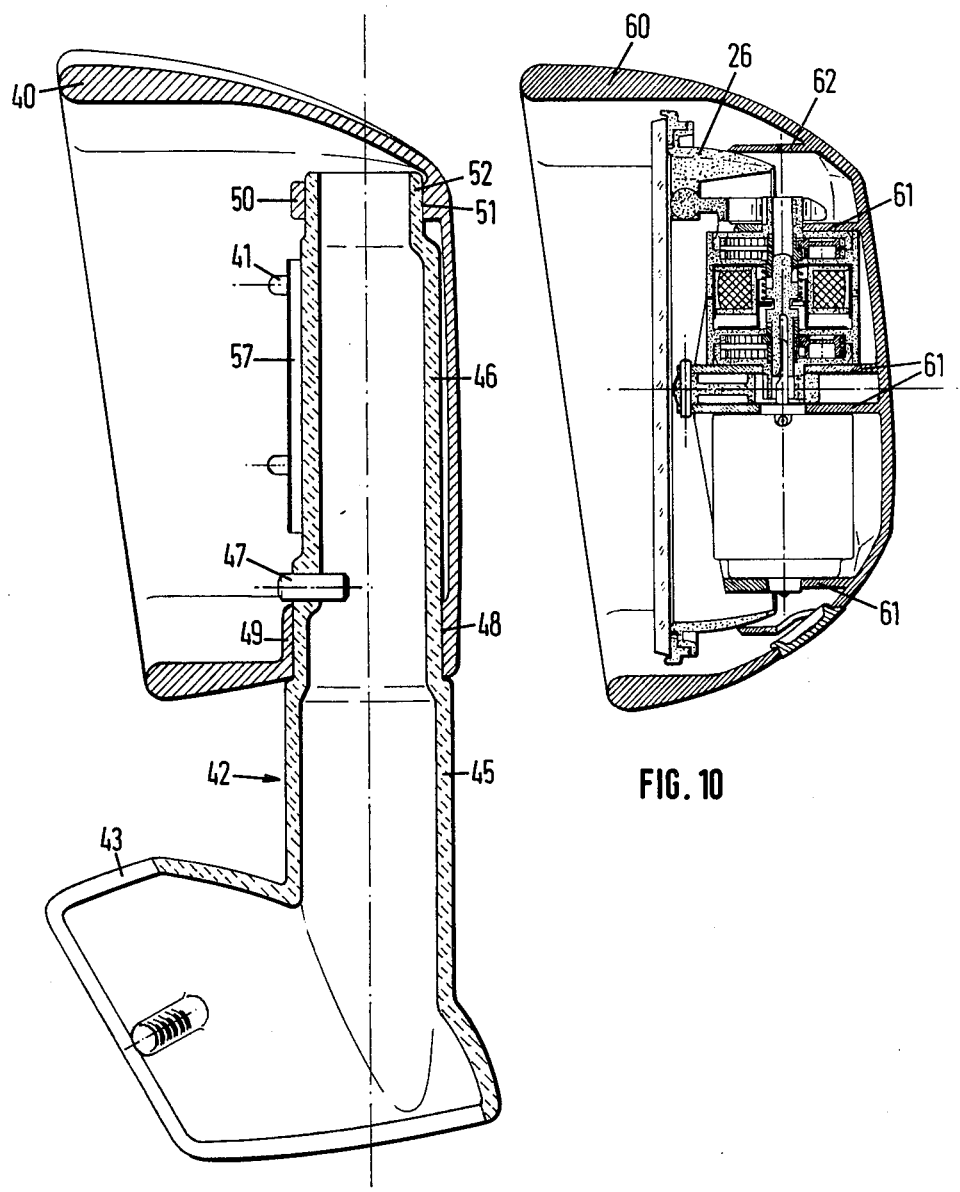

MOTOR-CAR MIRROR ADJUSTABLE ABOUT TWO PERPENDICULAR AXES

This invention relates to an adjustable motor-car mirror.

In co-pending patent application Ser. No. 751,709, which is owned by the assignee of the present application, which is incorporated herein by reference, there has been described apparatus for adjusting a motor-car mirror about two mutually perpendicular axes, essentially consisting of a housing having therein a reversible motor, an electromagnetically operable clutch and two planetary transmission assemblies each having an output shaft connected to a mirror adjusting unit.

Under adverse conditions, when mounted on a vehicle, the prior device may exhibit undue vibration. It has been found that, under extreme conditions, the mirror proper may exhibit an annoying vibration of its own relative to the vehicle, caused mainly by the vortex pattern of the air flowing along the edges of the mirror into and out of the housing. It has moreover been found that these air currents may introduce dirt and dust into the adjustment mechanism, so that it is necessary for this mechanism to be provided with a separate dust cap, for example, of rubber.

It is an object of the present invention to provide an apparatus for adjusting a motor-car mirror about two mutually perpendicular axes of the type described above, whereby vibrations are properly suppressed and good sealing against dust is ensured.

The apparatus according to the present invention is characterized in that the mirror adjusting units engage a tilting adjusting ring which in any position is in sealing contact with a raised edge of the bottom member of the housing. In the above-described prior art construction, adjusting units are directly connected to the mirror mounting plate by a cross-piece in the center of the mirror mounting plate and a snap connection located at some distance from the center. By having the mirror adjusting units act on a tilting adjusting ring, the advantage is obtained that irrespective of the position of the mirror, this ring will remain in contact with a raised edge of the bottom member of the housing, so that frictional forces are introduced which increase the resistance against unintentional tilting movements of the mirror and thereby also act to dampen vibration. Additionally, this arrangement provides for dust-tight sealing of the gap present in the prior apparatus between the rear surface of the mirror mounting plate and the housing, so that dirt is unable to penetrate into the adjusting mechanism, and a separate dust cap can be omitted.

Preferably, the adjusting ring has a spherically rounded outer surface which during the tilting movements of the adjusting ring remains in contact with, and slides over, the sealing rim of the cylindrical raised edge of the bottom member of the housing.

In a preferred embodiment of the apparatus according to the invention, in order to eliminate effects of the friction of the sealing rim on the adjusting ring that adversely affect the adjustment, the adjusting ring is provided with at least two inwardly extending dogs located adjacent to the circumference of the adjusting ring, said dogs being angularly spaced apart a distance of 90° and having recesses capable of receiving the extremities of the mirror adjusting units by means of a snap connection. By virtue of the fact that the points of connection for the adjusting units are disposed a relatively large distance from the center, a stable construction, free from vibration is produced.

In order that the mirror may be easily mounted on the apparatus according to the invention, the adjusting ring is preferably provided with an outwardly projecting flange, the mirror mounting plate having a corresponding flange with a plurality of dogs capable of engaging under the projecting flange of the adjusting ring.

According to the invention, the housing for receiving the adjusting mechanism is of bipartite construction, with the boundary face between the two parts extending parallel to the mirror in the neutral position, the parts of the housing in mounted condition forming the bearing for the mirror drive mechanism, the bottom part of the housing being formed as a dust cap, and the assembled housing being provided at the corners of the top housing member with apertures for securing the apparatus in a protective cap suitable for being mounted on a vehicle.

Motor-car mirrors are often housed in housings suitable for being mounted, for example, on the door of a vehicle. These housings commonly consist of a protective cap and a mounting column. Safety rules prescribe that these protective caps must be capable of pivoting about the mounting column when a certain force is exerted on them.

The present invention also provides a safety housing suitable for mounting a mirror adjusting apparatus according to the invention. The safety housing according to the present invention is characterized in that the protective cap comprises two integral, substantially parallel partitions spaced apart so as to be capable of receiving the top part of a mounting column between them, there being provided clamping means, in the mounted condition of the housing, for clamping the partitions against the surface of the shank of said mounting column.

Preferably, the top part of the mounting column is provided with an axial notch, while one of the partitions has a correspondingly shaped projection, which is pressed into the notch by a resilient metal clip.

There is thus produced a very simple construction in which the protective cap cannot be misadjusted, for example, by the wind as the vehicle is in motion, whereas, when an impact force is exerted on the protective cap, the projection can move out of the notch, and the cap can pivot about the mounting column. This construction is particularly suitable when the cap is made of plastic, so that the partitions between which the top shaft portion of the column is received can be provided as the cap is formed.

In another embodiment of the safety housing, the latter is formed so that it can also function as the bottom member of the housing for the adjusting mechanism. For this purpose the protective cap of the safety housing is formed with a plurality of integral support ridges which comprise bearing means for journalling the drive mechanism, as well as with an integral raised edge, circular in cross-section, which is in sealing contact with the adjusting ring of the adjusting mechanism. Some embodiments of the invention will now be described, by way of example, with reference to the accompanying drawings.

In said drawings:

FIG. 3 is a cross-sectional view, taken on the line III—III of FIG. 1;

FIG. 4 is a cross-sectional view, taken on the line IV—IV of FIG. 1;

FIG. 6 is a cross-sectional view, taken on the line VI—VI of FIG. 5;

FIG. 10 is a cross-sectional view, taken on the line X—X of FIG. 8.

Figure 1:
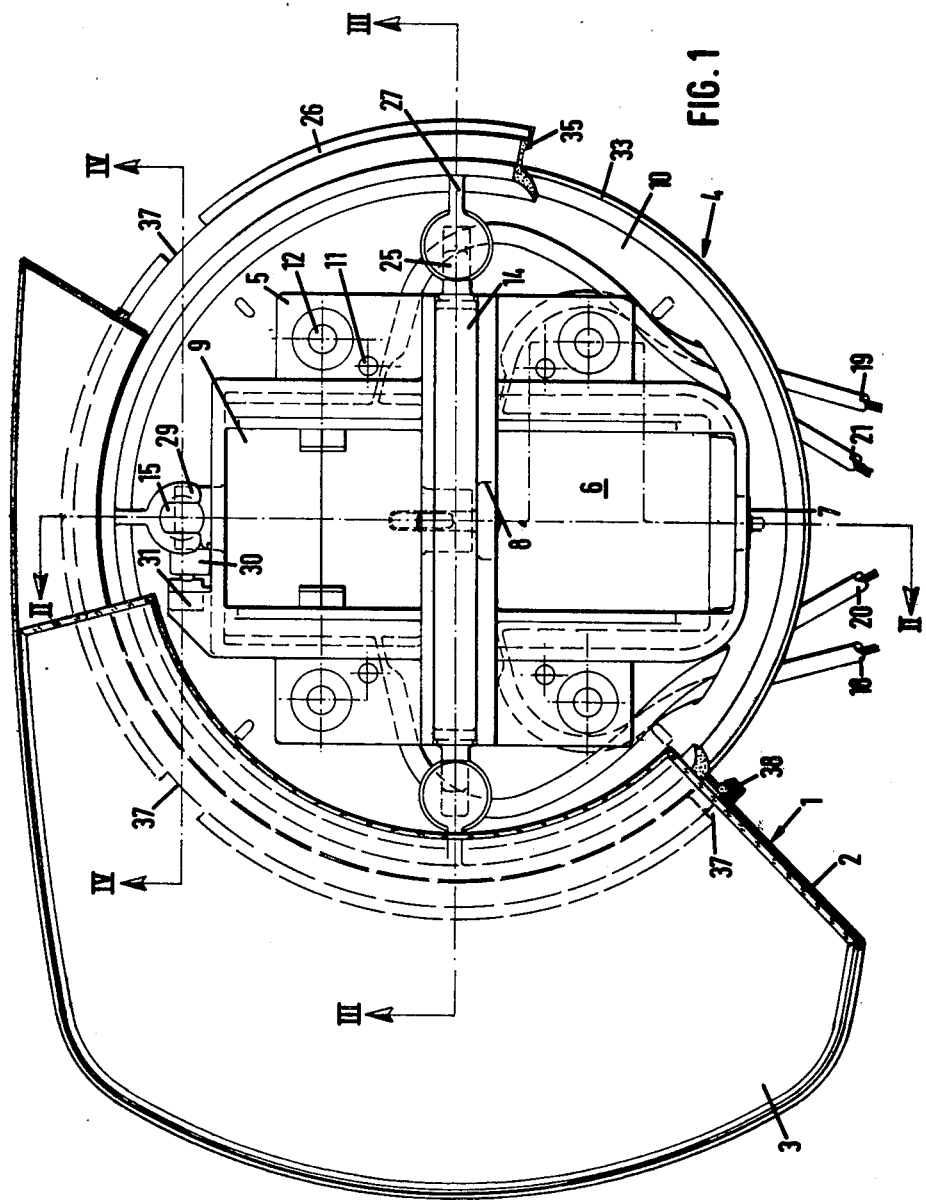
FIG. 1 is a front elevational view of the mirror adjusting instrument on an enlarged scale, and on which an adjustable motor-car mirror is placed, with some parts being boken away.
Figure 2:
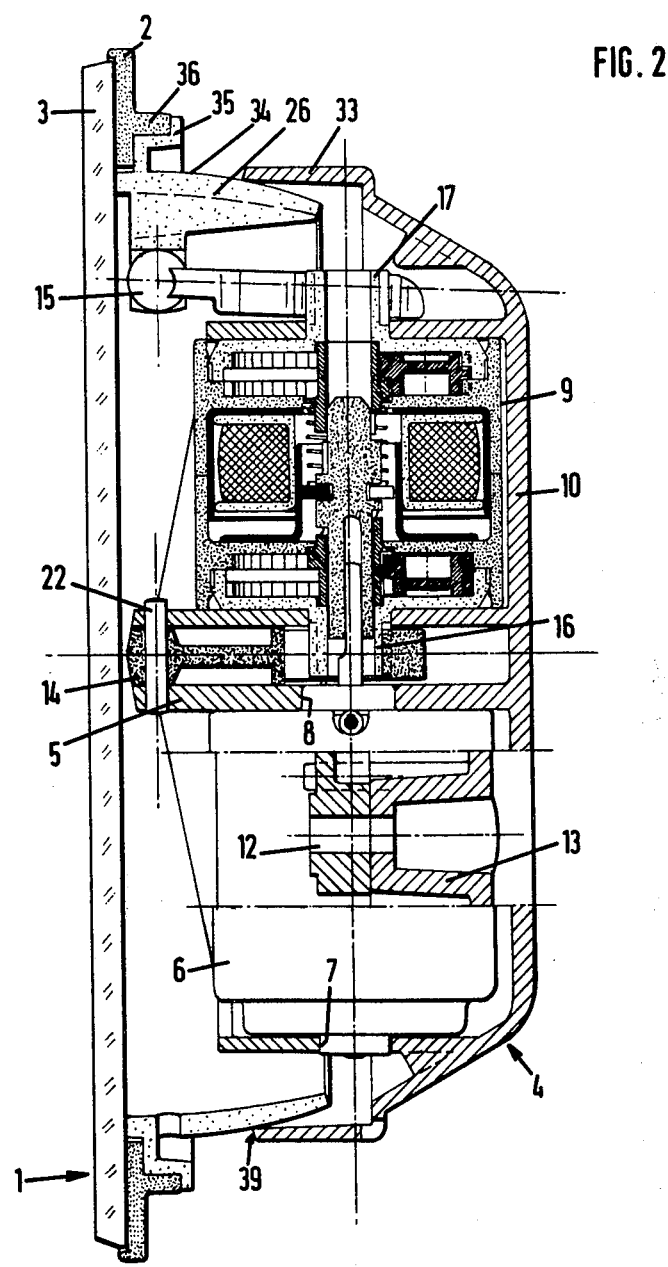
FIG. 2 is a cross-sectional view, taken on the line II—II of FIG. 1.

Referring in particular to FIGS. 1-4, reference numeral 1 designates a subassembly of an adjustable motor-car mirror according to the present invention, consisting of a mirror mounting plate 2, to which a mirror 3 is secured, for example, by means of a suitable adhesive. Subassembly 1 is mounted on an adjusting mechanism 4 for adjusting the mounting plate about two mutually perpendicular axes. The adjusting mechanism 4 consists essentially of a frame 5 having a reversible motor 6 journalled in frame 5 at 7 and 8. Frame 5 furthermore mounts a drive mechanism 7 and consisting essentially of a cylindrical housing having an electromagnetically operable clutch and two planetary transmission assemblies thereon. This drive mechanism is identical to that described in our co-pending patent application referred to hereinbefore. It does not constitute part of the present invention and will not, therefore, be described in more detail hereinafter. Frame 5, together with a dust cap 10, forms a housing for motor 6 and drive mechanism 9, dust cap 10 being provided with a plurality of ridges extending substantially perpendicular to the bottom of cap 10, for supporting elements 6 and 9. In order that parts 5 and 10 may be correctly positioned relative to each other, cap 10 is provided with a plurality of pilot pins 11 which can be inserted in correspondingly formed recesses in the underside of frame 5. Frame 5 is further provided at the corners with mounting holes 12, which in the mounted condition come to lie in juxtaposition with raised supports 13 of cap 10. Naturally, supports 13 are likewise provided with holes therethrough in alignment with holes 12 in frame 5.

Interposed between motor 6 and drive mechanism 9 is a first mirror adjusting unit 14 for adjusting the mirror about an axis through the heartline of a pin 22 with which the first mirror adjusting unit 14 is secured in frame 5. A second mirror adjusting unit 15 is provided at the other end of drive mechanism 9 for adjusting mirror 1 about an axis perpendicular to the axial direction of pin 22 and moreover perpendicular to the plane of drawing in FIG. 2. Mirror adjusting units 14 and 15 are driven by means of gears 16 and 17 each mounted on the output shaft of an associated planetary transmission assembly forming part of drive mechanism 9. In FIG. 1, reference numerals 18 and 19 designate voltage supply leads for motor 6, while leads for the coil of the electromagnetic clutch of the drive mechanism 9 are designated by 20 and 21.

As is best shown in FIG. 3, mirror 1 can be pivoted about an axis through pin 22 by means of the first mirror adjusting unit 14. To this effect, the first mirror adjusting unit 14 consists essentially of a rocker element 23 having a toothed portion 24 at its bottom, which is in engagement with gear 16 of one of the planetary transmission assemblies. Rocker 23 has on opposite ends thereof a trunnion 25 positioned by a snap connection in a recess 28 of an a dog 27 provided on the inside of adjusting ring 26. Adjusting ring 26 has a spherical surface 34 on the outside thereof which during the pivoting movements of the mirror continues to be in contact with, and slides over, a sealing rim 39 of a raised edge 33 of dust cap 10.

This raised edge 33 is cylindrical in shape, so that sealing rim 39 is continuously in contact with the spherical surface 34 of adjusting ring 26. It will be clear that dust cap 20 and hence edge 33 is preferably made of the same plastic material as is adjusting ring 26 to ensure that, irrespective of the ambient temperature to which motor-car mirrors are subjected, edge 33 and ring 26 remain properly in contact with each other. Therefore, the co-efficients of expansion of parts 26 and 33 must be equal.

The tilting movement of mirror 1 about its other axis of adjustment is effected by means of the second mirror adjusting unit 15 which (see FIG. 4) comprises a toothed portion 30 which is in engagement with gear 17 driven by the second planetary transmission assembly. The extremity 32 of the second mirror adjusting unit 15 is positioned by a snap connection in projection 29, which like projections 27 is arranged on the inside of adjusting ring 26. The second mirror adjusting unit 15 is biased against gear 17 by means of an arm 31, which forms a part of frame 5 (see FIG. 1). Gear transmission 16-24 and 17-30 have a construction such that in the case of overload, for instance a shock load on mirror 1, the connection can be broken. Rocker 23 of the first mirror adjusting unit 14 must therefore be formed of a resilient material such that in the case of overload teeth 24 can slide over gear 16. The same applies to the second mirror adjusting unit 15.

Mirror adjusting ring 26 is provided on the outside with a stepped peripheral flange 35. Mirror mounting plate 2 has a corresponding flange, which therefore accurately fits in and on flange 35. Flange 35 is provided at a number of positions (see FIG. 1) with recesses 37, at which positions dogs 38 of flange 36 of plate 2 can engage under flange 35 of ring 26. Mirror 1 can therefore be readily pressed on to adjusting mechanism 4 so that plate 2 is properly in contact with ring 26 throughout its circumference.

Figure 5:
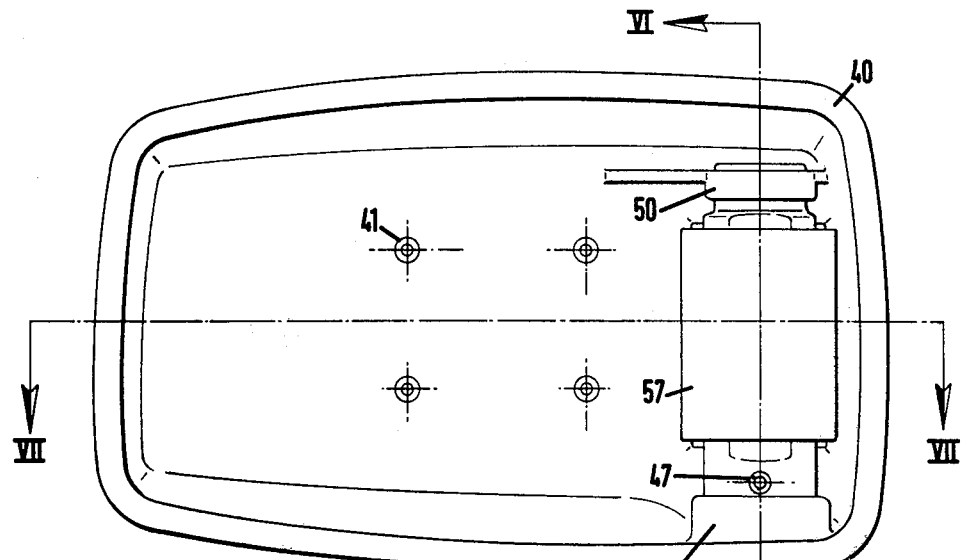
FIG. 5 is a front elevational view of a safety housing, shown in actual size, for an adjustable motor-car mirror as shown in FIGS. 1-4.
Figure 7:
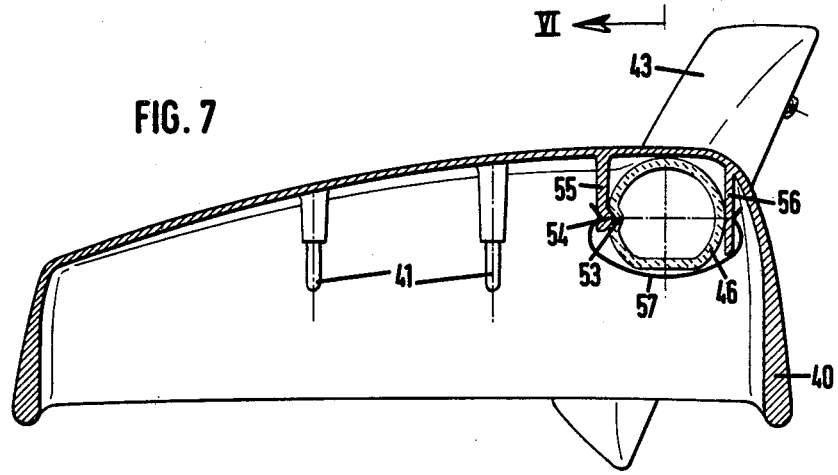
FIG. 7 is a cross-sectional view, taken on the line VII—VII of FIG. 5.

FIGS. 5-7 show a safety housing for receiving an adjustable motor-car mirror with an adjusting mechanism as shown in FIG. 1-4. The housing consists essentially of a protective cap 40 and a mounting column 42. Column 42 is provided with a domed mounting plate 43, adapted to the shape of the vehicle to which the column is secured by means of pins 44. The vertical shank 45 of column 42 has a portion 46 of reduced diameter, which can be inserted through fitting holes in cap 40. To this end cap 40 is provided with a raised portion 49 having a bore 48 therethrough in which shank portion 46 fits. The extremity 52 of shank 45 is received in a bearing 50 formed within cap 40 and having an aperture 51 corresponding to the diameter of extremity 52 of the shank. A locking pin 47 prevents the cap from sliding along shank 45, 46, 52.

Arranged in cap 40 are four fastening pins 41 spaced such a distance from each other that fastening holes 12 of frame 5 can be slid on to these pins 41, and frame 5 subsequently fastened to pins 41 with nuts.

The particular feature of the safety housing shown in FIGS. 5–7 is that the simple structure is such that when cap 40 is subjected to a heavy impact load it can pivot around shank portion 46. To this end partitions 55 and 56 are provided within cap 40, spaced apart so as to receive shank portion 46 in a close fit between them. Cap 40 consists of a suitable plastic material, so that partitions 55 and 56 can easily be formed integrally with, and together with it. Shank portion 46 of the mounting column has a longitudinal notch 53, while partition 55 is provided with a projection 54 fitting in the notch 53. Partitions 55 and 56 are pressed against shank portion 46 by means of a metallic resilient clip 57. Due to the fact that projection 54 is held in notch 53 under pressure, the cap is capable of undergoing light impact forces without being turned relative to column 42. In the case of heavier impact forces, for example when cap 40 is struck by a bicycle or other vehicle, projection 54 will become dislodged from notch 53, and cap 40 can pivot relative to column 42.

Figure 8:
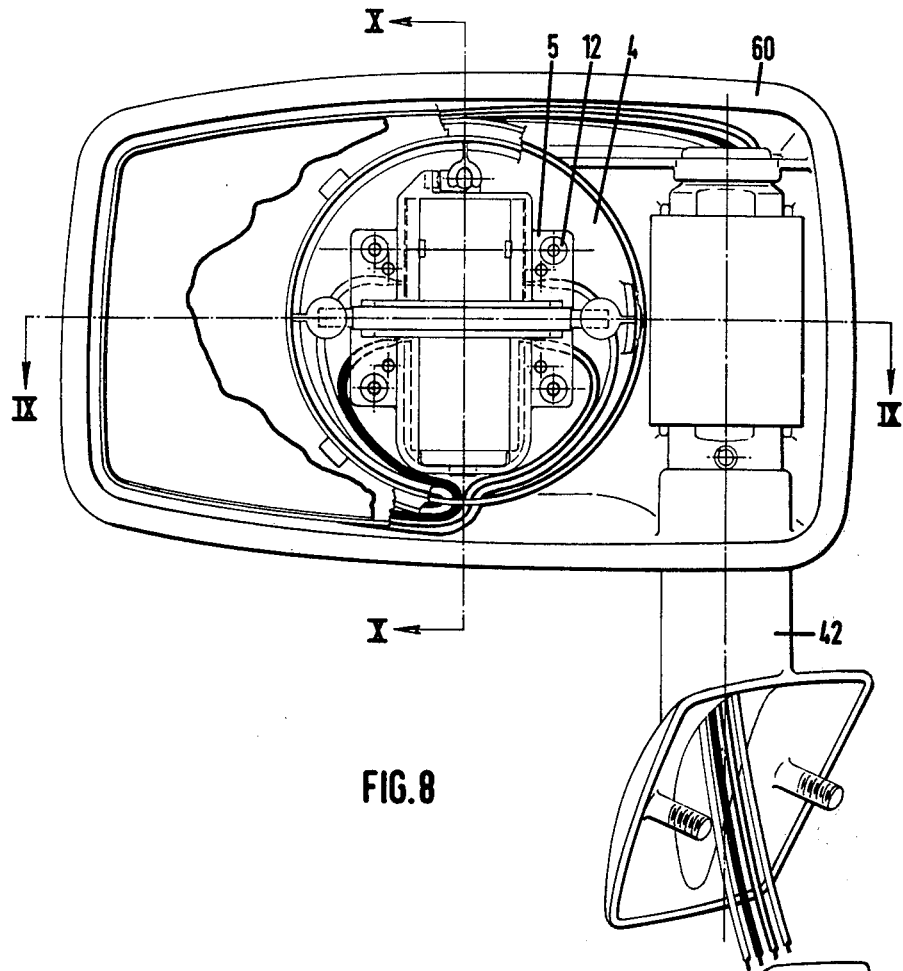
FIG. 8 is a front elevational view of a mirror adjusting instrument mounted in a safety housing in a second embodiment.
Figure 9:
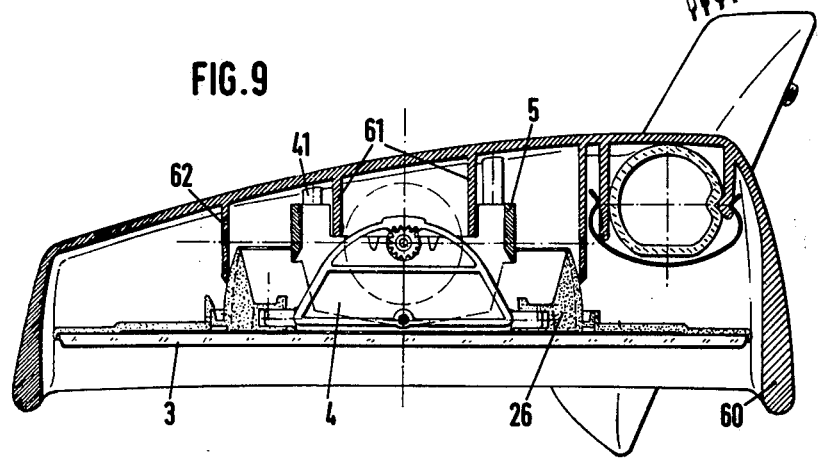
FIG. 9 is a cross-sectional view, taken on the line IX—IX of FIG. 8.

FIGS. 8–10 show a safety housing corresponding to FIGS. 5–7, in which housing a mirror adjusting device according to FIGS. 1–4 is mounted. Cap 60 of the safety housing is shaped slightly diifferently from cap 40 of FIGS. 4–7. In this embodiment, a plurality of support ridges 61 are formed in the bottom of the cap, which have the same shape as those in the dust cap shown in FIG. 2. On these support ridges 61, motor 6 and the drive mechanism 9 of the adjusting mechanism 4 come to rest, while frame 5 is secured on pins 41 in cap 60. At the rear of cap 60 is formed a cylindrical raised edge 62 to engage, similar to edge 33 of dust cap 10, with the outer surface of adjusting ring 26.

I claim:

1. An apparatus for adjusting a motor car mirror around two mutually perpendicular axes, said apparatus comprises a housing having therein a reversible motor, an electromagnetic clutch means connected to said motor, and two planetary transmission assemblies connected to said clutch means and each having an output shaft, said housing further having a cylindrical wall around said motor, clutch means and transmission assemblies having a sealing edge thereon, a tilting adjusting ring having a spherical surface thereon in sliding sealing engagement with said sealing edge and having means thereon for holding a mirror mounting plate on said adjusting ring, said adjusting ring further having at least two inwardly extending dogs thereon extending inwardly from the circumference of said adjusting ring, said dogs being circumferentially spaced from each other by 90° and having recesses therein, and mirror adjusting members connected between the respective planetary transmission assemblies and the corresponding dogs and engaged in a snap fit in the recesses in said dogs for swiveling movement in said recesses, whereby the force for swiveling said adjusting ring is transmitted from said transmission assemblies to said adjusting ring adjacent the circumference of said adjusting ring.

2. An apparatus as claimed in claim 1, wherein said adjusting ring has an outwardly projecting flange having recesses therein through which dogs on a mirror mounting plate can engage around said flange for holding a mirror mounting plate on said adjusting ring.

3. An apparatus as claimed in claim 1, wherein said housing has a bipartite construction, the boundary face between the two parts of the housing extending parallel to the plane of said adjusting ring when said adjusting ring is in the neutral position, the parts of the housing in the assembled condition providing bearings for the mirror drive mechanism, the bottom part of the housing constituting a dust cap, and the housing having apertures at the corners of the top part for securing the housing in a protective cap suitable for being mounted on a vehicle.

4. In combination, a safety housing suitable for mounting an apparatus for adjusting a motor car mirror, said safety housing comprising a protective cap and a mounting column extending into said protective cap, the protective cap having two integral, substantially parallel partitions spaced apart for receiving the top part of the mounting column between them and a clamping means clamping the partitions against the outside surface of the top part of the mounting column, and an apparatus for adjusting a motor car mirror around two mutually perpendicular axes, said apparatus having a housing mounted in said safety housing and having therein a reversible motor, an electromagnetic clutch means connected to said motor, and two planetary transmission assemblies connected to said clutch means and each having an output shaft, said housing further having a cylindrical wall around said motor, clutch means and transmission assemblies having a sealing edge thereon, a tilting adjusting ring having a spherical surface thereon in sliding sealing engagement with said sealing edge and having means thereon for holding a mirror mounting plate on said adjusting ring, said adjusting ring further having at least two inwardly extending dogs thereon extending inwardly from the circumference of said adjusting ring, said dogs being circumferentially spaced from each other by 90° and having recesses therein, and mirror adjusting members connected between the respective planetary transmission assemblies and the corresponding dogs and engaged in a snap fit in the recesses in said dogs for swiveling movement in said recesses, whereby the force for swiveling said adjusting ring is transmitted from said transmission assemblies to said adjusting ring adjacent the circumference of said adjusting ring.

5. An apparatus for adjusting a motor car mirror around two mutually perpendicular axes, said apparatus comprising a safety housing having thereon a plurality of integral support ridges and an integral cylindrical wall and further having therein a reversible motor, an electromagnetic clutch means connected to said motor, and two planetary transmission assemblies connected to said clutch means and each having an output shaft, the motor, clutch means and transmission assemblies being mounted in said support ridges and said cylindrical wall having a sealing edge thereon, a tilting adjusting ring having a spherical surface thereon in sliding sealing engagement with said sealing edge and having means thereon for holding a mirror mounting plate on said adjusting ring, said adjusting ring further having at least two inwardly extending dogs thereon extending inwardly from the circumference of said adjusting ring, said dogs being circumferentially spaced from each other by 90° and having recesses therein, and mirror adjusting members connected between the respective planetary transmission assemblies and the corresponding dogs and engaged in a snap fit in the recesses in said dogs for swiveling movement in said recesses, whereby the force for swiveling said adjusting ring is transmitted from said transmission assemblies to said adjusting ring adjacent the circumference of said adjusting ring.

* * * * *